March 4, 1941.  L. W. STAHL ET AL  2,233,649
VALVE
Filed May 10, 1938
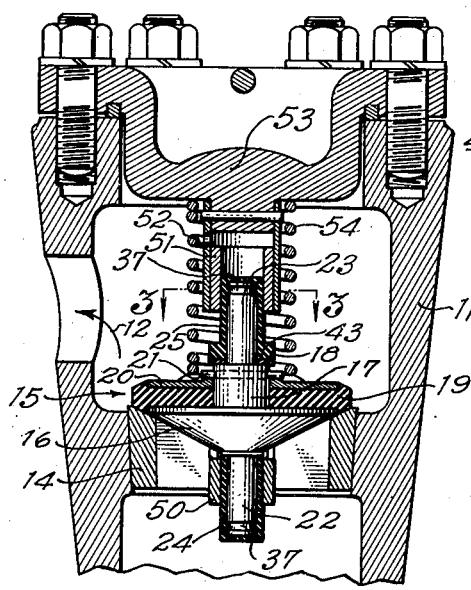
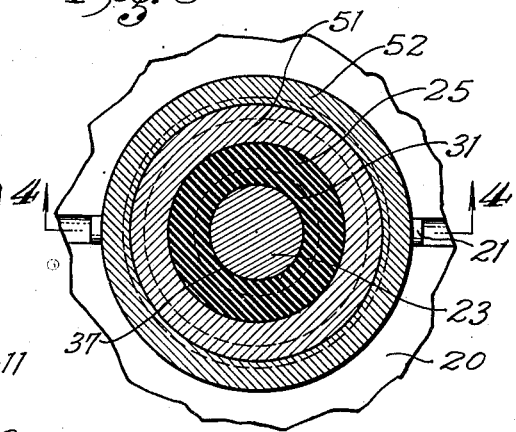
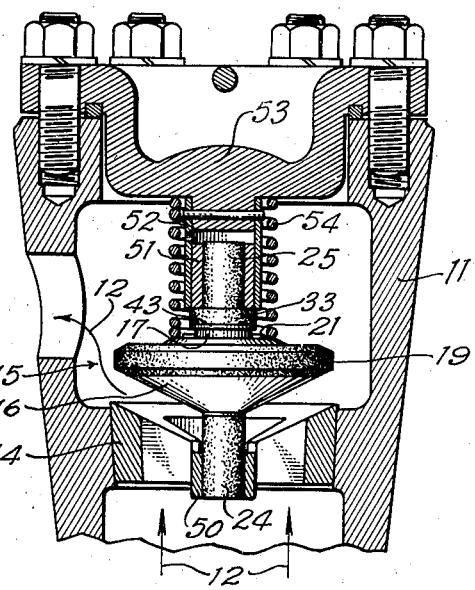
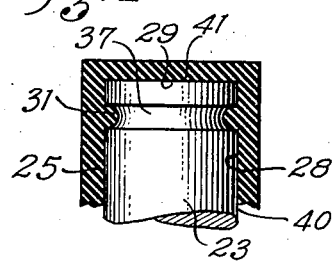
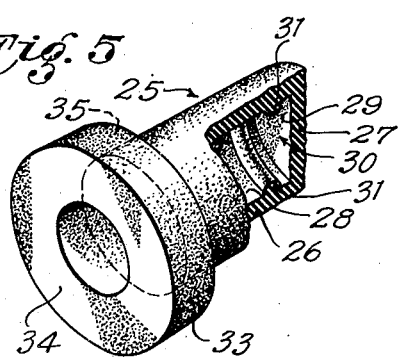
LESLIE W. STAHL and
GEORGE W. WALTON,
INVENTORS.
BY
ATTORNEY Patented Mar. 4, 1941

2,233,649

UNITED STATES PATENT OFFICE 2,233,649

VALVE

Leslie W. Stahl, Houston, Tex., and George W. Walton, Beverly Hills, Calif., assignors to Emsco Derrick & Equipment Company, Los Angeles, Calif., a corporation of California Application May 10, 1938, Serial No. 207,052

5 Claims. (Cl. 251—144)

Our invention relates to fluid valve constructions which are made expressly for use in pumps handling highly abrasive fluids.

Our invention is of utility in many industries wherein fluid having abrasive properties is pumped under pressure, and it has a particular utility in the oil well drilling industry where it is common practice to pump rotary mud or slush into the well. This rotary mud or slush consists of a mixture of earth and water which forms a muddy consistency suitable to be pumped as a fluid, and it is common practice to mix with the rotary mud a heavier material, such as iron oxide, barium sulphate, and the like, in order to give the rotary mud sufficient weight to support the walls of the hole being drilled. The rotary mud therefore is highly abrasive and produces severe attritional or wearing action on the various parts of the fluid pump used to pump this rotary mud, and this abrasive action is particularly severe on the valves and valve guides.

It is an object of our invention to provide a fluid valve having guide means for causing the valve to move in an axial line, thus assuring accurate seating of the valve against its seat, and in which the guide means has anti-wear means applied thereto which will reduce the wear on the coengaging parts and thus lengthen their life.

It is an object of our invention to provide a fluid valve having an upper and lower valve stem which cooperates with walls of the pump structure for guiding the valve during its opening and closing travels, and in which these stems are provided with resilient anti-wear bushings which produce but little wear on the parts which they coengage, and which themselves are relatively simple and economical to replace.

It is a further object of our invention to provide anti-wear bushings of the character referred to in the preceding paragraph which are of simple construction, and which incorporate positive means for retaining them on the guide stems.

It is a still further object of our invention to provide a construction of the character pointed out in the second preceding paragraph in which the valve stems are provided with annular grooves or recesses, and in which the bushing members are provided with annular projections which extend into the annular grooves and retain the bushings in place.

It is a still further object of our invention to provide a combination as pointed out in the preceding paragraph in which the securing means, which consists of the annular groove and the annular projection, is formed near the outer end of the valve stem, and in which the bushing is made from a resilient material so that when it is being installed on the valve stem and the annular projection comes into engagement therewith that portion of the bushing will expand to allow the annular projection to pass along the valve stem until it reaches the annular groove, at which time the dilated portion of the bushing will contract, thus bringing the annular projection into the annular groove.

It is a still further object of our invention to provide a combination as pointed out in any of the preceding paragraphs in which the upper anti-wear bushing includes a bumper means which limits the travel of the fluid valve and determines the "open" position of the fluid valve.

It is an additional object of our invention to provide a combination as referred to in the preceding paragraph in which there is a supporting washer for supporting the bumper. This supporting washer may be of different thicknesses in order to adapt the anti-wear bushing to fluid valves which do not have flat shoulders and in order to cause a shoulder on the fluid valve to support the bumper during its operation.

It is, in addition to this, an object of our invention to provide as a new article of manufacture an anti-wear bushing for use on fluid valves adapted to handle highly abrasive materials.

In the accompanying drawing we have illustrated a preferred form of our invention and will now proceed to describe the same. It should be understood, however, that various alterations and modifications may be made without departing from the spirit and scope of our invention. It is our intention, therefore, not to be limited to the form of our invention which we have chosen to illustrate the principle thereof, but do intend that our invention be construed in accordance with the spirit and scope of the appended claims.

Referring to the drawing:

Fig. 1 is a vertical section view showing a fluid valve incorporating the features of our invention in open position in a valve chest.

Fig. 2 is a vertical sectional view showing the fluid valve of our invention in closed position, and in this view the anti-wear bushings are in section.

Fig. 3 is a fragmentary sectional view taken as indicated by the line 3—3 of Fig. 2 which particularly shows the annular groove and annular projection means which retains the anti-wear bushing on the valve stem.

Fig. 4 is a fragmentary sectional view taken on the line 4—4 of Fig. 3.

Fig. 5 is a perspective view partly in section of an anti-wear bushing of our invention incorporating a bumper.

Referring to the drawing in detail, the form of our invention which we have chosen to illustrate the principle thereof is adapted for use in slush pumps, such as are commonly employed in the oil drilling industry wherein the invention has a particular utility. The numeral 11 represents a valve chest through which the fluid being pumped is adapted to flow, as indicated by arrows 12. The chest 11 supports a removable valve seat 14 with which a valve 15 is adapted to cooperate, this valve 15 illustrated in the drawing incorporating the features of our invention. The valve 15 has a valve body 16 adapted to engage the valve seat 14. Projecting upwardly from the body 16 is a shank 17 having a shoulder 18 formed at the upper end. Adapted to engage the upper part of the body 16 is a rubber sealing member 19 which is retained in place by a plate 20 and a securing pin 21. Extending downwardly from the body 16 is a lower valve stem 22, and extending upwardly therefrom is an upper valve stem 23. These stems 22 and 23 are in axial alignment.

Supported on the valve stems 22 and 23 are anti-wear bushings 24 and 25. As illustrated in Fig. 5, the upper anti-wear bushing 25 includes a cylindrical wall 26 and an end wall 27 having an inner cylindrical wall 28 and an inner flat wall 29, respectively, which define a cavity 30. Projecting inwardly from the cylindrical wall 28 and near the end wall 27, but spaced therefrom as shown, is a fully annular projection 31.

The construction of the lower anti-wear bushing 24 is identical to the construction of the upper anti-wear bushing 25 thus far described. The upper anti-wear bushing 25 in addition has a bumper 33 formed at its inner end which consists of an enlarged portion having a lower flat face 34 and an upper flat face 35.

The two bushings 24 and 25 are made from a resilient anti-wear material. The bushings may be made from rubber, rubber compound, or synthetic rubber. It is found in practice that when making the anti-wear bushing from such a material the rotary mud or abrasive material being pumped produces much less wear on the parts than if there were metal-to-metal contact, and that a larger part of the wear takes place on the anti-wear bushing which, as will be pointed out shortly, is readily renewable.

As illustrated in the enlarged views, Figs. 3 and 4, the stems 22 and 23 are each provided with an annular groove or a recess 37 formed near the end of each of the stems 22 and 23. Each groove 37 is complementary in shape to the annular projection 31 so that the same is readily accommodated thereby. The bushings 24 and 25 are slid onto the stems 22 and 23 from the ends thereof. When that portion of the bushing which contains the projection reaches the end of the stem, it is dilated so that it may be slipped onto the end of the stem, and when the projection reaches the groove, the bushing by reason of its resiliency returns to normal shape, with the result that the inner walls 28 and 29 snugly engage the outer cylindrical wall 40 and the flat end wall 41 of each of the valve stems 22 and 23. Likewise, the annular projection 31 of each bushing fits snugly in the annular grove 37 of each stem. This securing means, consisting of the projection and groove arrangement, positively retains the bushings on the stems. If any force is exerted tending to remove the bushings from the stems, this produces a contraction of the bushings and therefore produces a positive force tending to hold the projections in the grooves.

In installing the upper anti-wear bushing 25 on the upper stem 23, a supporting washer 43 is first placed on the stem 23 in engagement with the shoulder 18. When the anti-wear bushing 25 is installed in place the lower face 34 engages the washer 43. It will be seen that the washer 43 fully engages the face 34 of the bumper 33 so that the shoulder 18 will lend full support to the bumper during operation. If the valve is of such a construction that there is not a fully annular shoulder 18, the washer 43, being made from a metal or other rigid material, is so supported as to give full support to the bumper 33. The washer 43 also acts as an adapter plate so that there will be no empty space between the face 34 and shoulder 18.

The lower stem extends through a lower guide 50 which forms a part of the valve seat 14, and the bushing 24 is reciprocable therein. The upper bushing 25 extends into a guide sleeve 51 which is supported by a supporting tube 52, which is in turn secured to a cover 53 of the valve chest 11. These two guide means 50 and 51 are in axial alignment, and since the stems 22 and 23 are in axial alignment these parts hold the valve concentric to the seat and cause the valve to move in an axial line during operation. The valve is normally closed by means of a compression spring 54. During the pressure stroke or exhaust stroke of the piston of the pump fluid pressure forces the fluid, as indicated by the arrows 12 of Fig. 11, and moves the valve from closed position, as illustrated in Fig. 2, into an open position, as illustrated in Fig. 1. It will be seen that the valve moves upwardly until the upper face of the bumper 33 engages the lower end of the sleeve 51. The bumper absorbs the shock of the impact and determines the open position of the valve 15. The valve illustrated in the drawing is an exhaust valve. It should be understood, however, that the invention is equally applicable to an intake valve.

When the bushings become worn they are readily replaceable. They can be easily removed by a suitable tool or, being made from a resilient material, can be slitted down one side and easily removed. Not only does this renew the cylindrical wall which engages the walls of the guide means 50 and 51, but it also renews the bumper 33 so that the proper open position of the valve will be maintained.

We claim as our invention:

1. In a fluid valve of the class described, the combination including: a valve body having upper and lower cylindrical valve stems extending therefrom in axial alignment, said stems having annular grooves formed therein near their outer ends; and anti-wear bushings supported on said stems, said bushings being made of a resilient anti-wear material, and having cylindrical walls engaging and surrounding said stems, end walls enclosing the ends of said stems, and annular projections formed on the interior and near the outer ends thereof which fit into said annular grooves and retain said bushings in place.

2. In a fluid valve of the class described, the combination including: a valve body having an upper axial valve stem, an annular groove formed in said stem, and a shoulder at the inner end of said stem; and an anti-wear bushing made of resilient anti-wear material supported on said stem, having an internal annular projection which fits into said annular groove and retains said bushing in place, and having a resilient bumper at the inner end thereof supported by said shoulder.

3. In a fluid valve of the class described, the combination including: a valve body having an upper axial valve stem, an annular groove formed in said stem, and a shoulder at the inner end of said stem; an anti-wear bushing made of resilient anti-wear material supported on said stem, having an internal annular projection which fits into said annular groove and retains said bushing in place, and having a resilient bumper at the inner end thereof supported by said shoulder; and a supporting washer placed between said bumper and said shoulder.

4. As a new article of manufacture, an anti-wear bushing for use on a valve stem of the character described having an annular groove spaced from the inner end thereof, and which is made from a resilient anti-wear material, such as rubber, rubber compound, or synthetic rubber, which includes: a cylindrical wall adapted to surround the valve stem; an end wall adapted to enclose the end of the valve stem; and an annular projection extending inwardly from said cylindrical wall spaced from said end wall and adapted to fit into said annular groove formed in the valve stem.

5. As a new article of manufacture, an anti-wear bushing for use on valve stems of fluid valves, and which is made from a resilient anti-wear material, such as rubber, rubber compound, or synthetic rubber, which includes: a cylindrical wall adapted to surround the valve stem; an end wall adapted to enclose the end of the valve stem; an annular projection extending inwardly from said cylindrical wall adapted to fit into an annular groove formed in the valve stem; and a bumper in the form of a shoulder extending outwardly at the inner end of said cylindrical wall.

LESLIE W. STAHL.
GEORGE W. WALTON.